(12) United States Patent
Hooper (10) Patent No.: US 7,111,071 B1
(45) Date of Patent: Sep. 19, 2006

(54) LONGEST PREFIX MATCH FOR IP ROUTERS

(75) Inventor: Donald F Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 09/608,354

(22) Filed: Jun. 29, 2000

(51) Int. Cl.
*G06F 15/173* (2006.01)
*H04L 12/28* (2006.01)
*H04L 12/56* (2006.01)

(52) U.S. Cl. ................................. 709/238; 370/395.32
(58) Field of Classification Search ................ 709/238, 709/243; 370/392, 401, 395.32, 395.31; 707/1, 3, 100
See application file for complete search history.

(56) References Cited

U.S. PATENT DOCUMENTS

| | | | | |
|---|---|---|---|---|
| 5,909,440 A | * | 6/1999 | Ferguson et al. | 370/389 |
| 5,917,821 A | * | 6/1999 | Gobuyan et al. | 370/392 |
| 5,946,679 A | * | 8/1999 | Ahuja et al. | 707/3 |
| 5,983,223 A | * | 11/1999 | Perlman | 707/6 |
| 6,011,795 A | * | 1/2000 | Varghese et al. | 370/392 |
| 6,018,524 A | * | 1/2000 | Turner et al. | 370/392 |
| 6,052,683 A | * | 4/2000 | Irwin | 707/8 |
| 6,061,712 A | * | 5/2000 | Tzeng | 709/202 |
| 6,067,574 A | * | 5/2000 | Tzeng | 709/247 |
| 6,192,051 B1 | * | 2/2001 | Lipman et al. | 370/389 |
| 6,212,184 B1 | * | 4/2001 | Venkatachary et al. | 370/392 |
| 6,307,855 B1 | * | 10/2001 | Hariguchi | 370/392 |
| 6,308,219 B1 | * | 10/2001 | Hughes | 709/238 |
| 6,493,347 B1 | * | 12/2002 | Sindhu et al. | 370/401 |
| 6,516,319 B1 | * | 2/2003 | Benayoun et al. | 707/100 |

(Continued)

OTHER PUBLICATIONS

Knox et al., "Parallel searching techniques for routing table lookup," Apr. 1, 1993, INFOCOM '93 Proceedings, Twelfth Annual Joint Conference of the IEEE Computer and Communications Societies, Networking: Foundation for the Future, vol. 3, pp. 1400-1405.*
Stiliadis, "High-Speed Policy-based Packet Forwarding Using Efficient Multi-dimensional Range Matching," html version of http://subjects.ee.unsw.edu.au/tele4352/packet_classification.doc, pp. 1-17.*
Hayashi et al., "High-Speed Table Lookup engine for IPv6 Longest Prefix Match," 1999, Global Telecommunications Converence, 1999, vol. 2, pp. 1576-1581.*
Kobayashi et al., "A Longest Prefix Match Search Engine for Multi-Gigabit IP Processing," Jun. 2000 IEEE International Conference on Communications, vol. 3, pp. 233-239.*
Degermark et al., "Small Forwarding Tables for Fast Routing Lookups," 1997 ACM 0-89791-905-X/97/0009, pp. 3-14.*

*Primary Examiner*—Krisna Lim
*Assistant Examiner*—Sean Reilly
(74) *Attorney, Agent, or Firm*—Fish & Richardson P.C.

(57) ABSTRACT

A method of searching a database for a prefix representing a destination address including loading two trees of tables, each tree of tables having a large table at a root branching to small tables and traversing the two tables of trees in parallel to find a match of an entry to the prefix. An entry includes a router pointer representing the destination address and a pointer to a next small table. The small tables include prefix match fields for indexed table entries, a population count of pointers and hidden prefix entries that hold shorter prefix route entry pointers.

15 Claims, 6 Drawing Sheets

U.S. PATENT DOCUMENTS

| | | | |
|---|---|---|---|
| 6,526,055 B1 * | 2/2003 | Perlman | 370/392 |
| 6,539,369 B1 * | 3/2003 | Brown | 707/1 |
| 6,560,610 B1 * | 5/2003 | Eatherton et al. | 707/104.1 |
| 6,563,823 B1 * | 5/2003 | Przygienda et al. | 370/392 |
| 6,567,404 B1 * | 5/2003 | Wilford | 370/389 |
| 6,658,482 B1 * | 12/2003 | Chen et al. | 709/245 |
| 6,691,218 B1 * | 2/2004 | Brown | 711/216 |
| 6,778,532 B1 * | 8/2004 | Akahane et al. | 370/392 |

* cited by examiner

LONGEST PREFIX MATCH FOR IP ROUTERS

TECHNICAL FIELD

This invention relates generally to longest prefix match for Internet Protocol (IP) routers.

BACKGROUND

A router uses a destination address of every incoming packet of data to decide the proper next-hop information of the packet. High-speed routers are required to make these decisions at the speed of several million packets per second. Each search finds the longest prefix match of the destination address among all stored prefixes in the router.

SUMMARY OF THE INVENTION

In one aspect, the invention features a network router including an input switch, an output switch, a controller, the controller including a plurality of look-up engines, each of the look-up engines receiving look-up requests in a round robin fashion, and a memory for storing data for access by a longest prefix match program, the program including a data structure stored in the memory, the data structure including information resident in a database used by the longest prefix match program and including a large table at a root, the root branching to nodes containing small trie tables, each trie table addressed by a span of Internet protocol (IP) address bits to locate an indexed trie entry, the indexed trie entry including a route pointer and a trie pointer.

BRIEF DESCRIPTION OF DRAWINGS

The foregoing features and other aspects of the invention will be described further in detail by the accompanying drawings, in which.

Like reference symbols in the various drawings indicate like elements.

DETAILED DESCRIPTION

Figure 1:
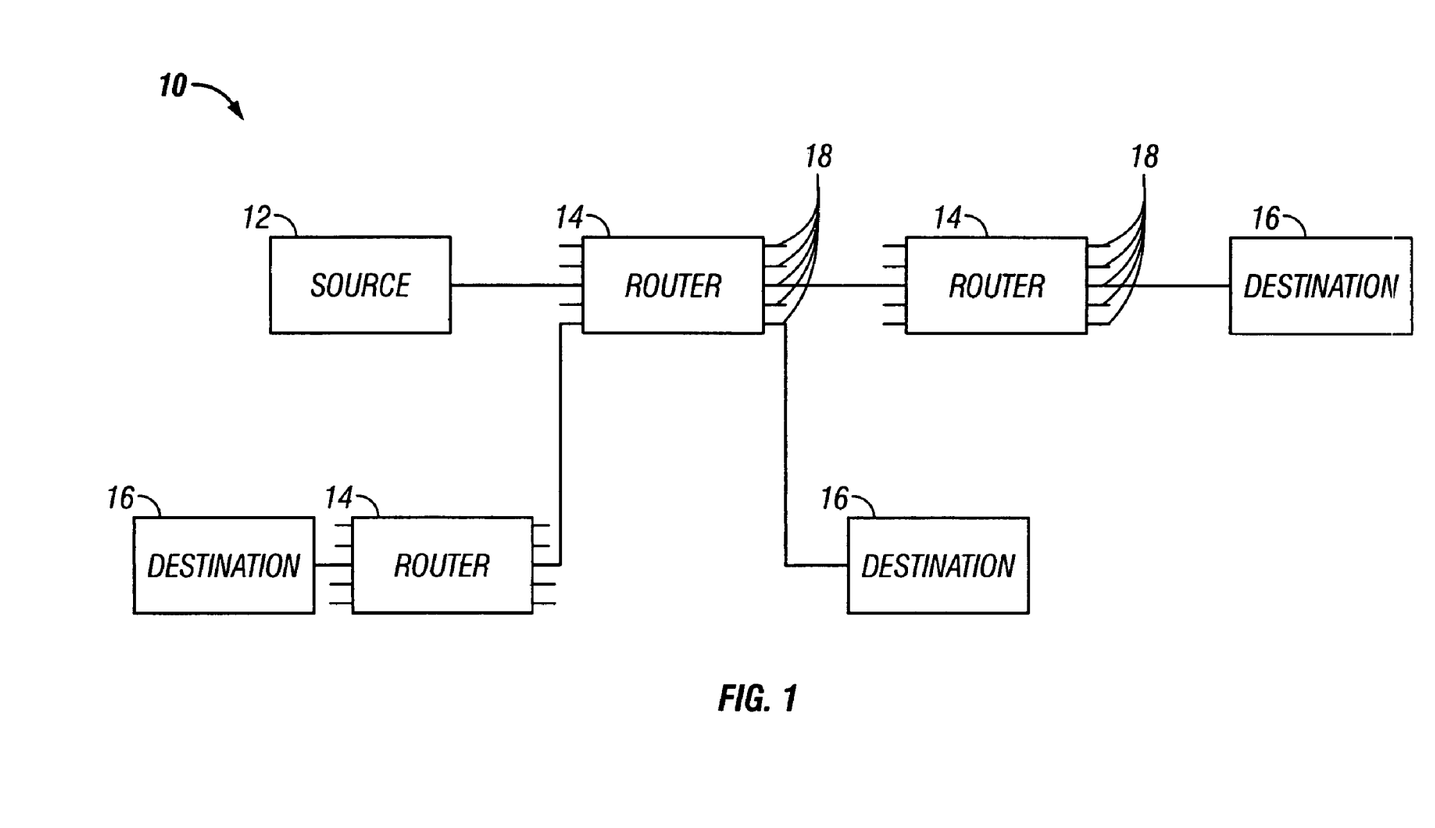
FIG. 1 is a block diagram of a packet switched network.

Referring to FIG. 1, in a packet switched network 10, a source 12 is connected to one or more routers 14 for transmitting packets to one or more destinations 16. Each router 14 includes a number of ports 18 that are connected to various sources and destinations. Accordingly, a packet from source 12 may pass through more than one router 14 prior to arriving at its destination 14.

Figure 2:
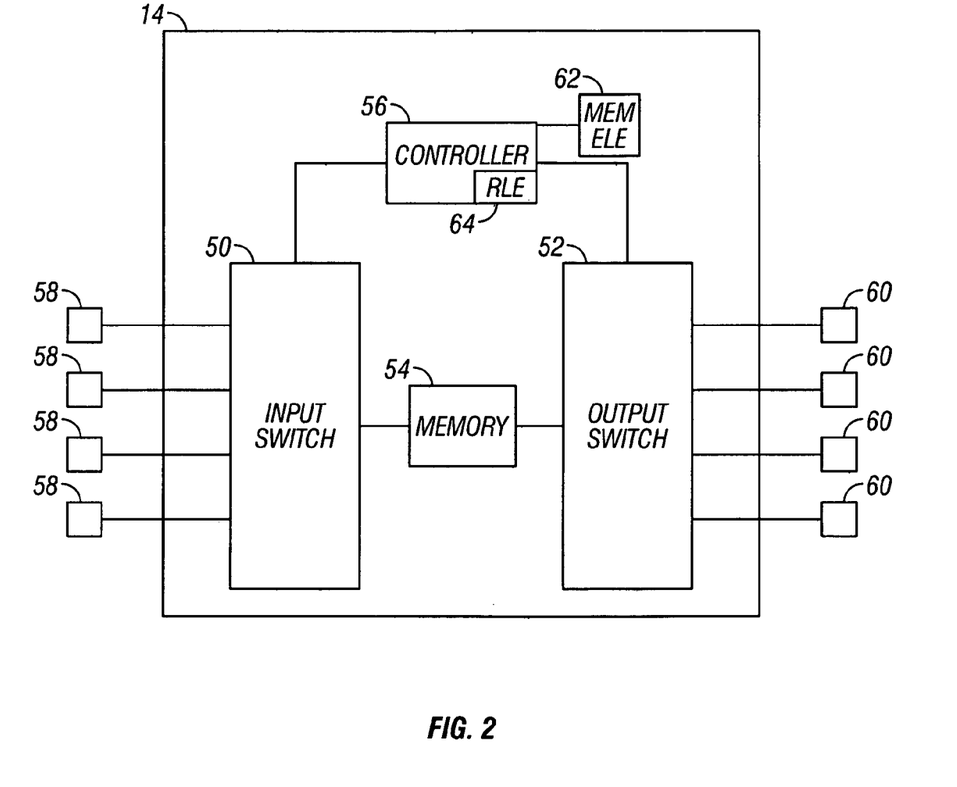
FIG. 2 is a block diagram of the router of FIG. 1.

Referring to FIG. 2, each router 14 includes an input switch 50, an output switch 52, a memory 54, a controller 56, a number of input ports 58 and a number of output ports 60. Associated with the controller 56 is a memory element 62 for storing controller data. Each switch 50 and 52 is connected to each input and output port 58 and 60, respectively, in the router 14. In an embodiment, router 14 includes eight input and output ports 58 and 60, respectively. In this embodiment, the number of input ports and output ports is equal, however, other embodiments may necessitate greater numbers of input ports or output ports.

Associated with the controller 56 is a route look-up engine (RLE) 64. In an embodiment, a number of route look-up engines 64 are included in the controller 56, each receiving look-up requests in round-robin fashion, so as to speed the routing process. In another embodiment, memory element 62 is a four bank static random access memory (SRAM) that includes route look-up engines 64 to service at full band width.

In operation, packets are received at an input port 58, transferred to the input switch 50, and stored temporarily in the memory 54. When the input switch 50 receives the packet, a destination address is extracted from the first data block in the packet and transferred to the controller 56. The input switch 50 includes a transfer engine (not shown) for transferring packets received from the input port 58 to memory 54.

Route look-up engine 64 performs a search for the longest prefix match of the destination address contained in a forwarding table (also referred to as a routing table) residing in the controller 56. IP version 4 (IPv4) forwarding tables include a set of routes that is updated by routing protocols such as RIP (Routing Information Protocol). Each route determines the outgoing interface, i.e., output port 60, for a set of IP destination addresses, which is represented by an IP address and a subnet mask. Both IPv4 addresses and the subnet masks are 32 bit numbers. In particular, if the $K^{TH}$ bit of the subnet mask is 1, it indicates that the $K^{TH}$ bit of the corresponding IP address is significant; otherwise, it indicates that the $K^{TH}$ bit is insignificant. For example, if the IP addresses 12345678 and FFFFF000 (both are in hexadecimal format) define a route, the set of addresses between 12345000 and 12345FFF belongs to this route. Each subnet mask includes contiguous ones from the most significant bit. Therefore, a route is defined by the prefix of the corresponding address. The route look-up engine 64 performs a look-up in its IP forwarding table to determine the longest prefix match. Once a match has been determined, the route look-up engine 64 returns a result that includes the output port 60 associated with the destination address.

The search result and other information (e.g., source ID, flow ID, packet length, quality of service and statistical information) for routing the packet through the router 14 combine to form a notification. The notification is transferred from the controller 56 to the output switch 52. Upon receiving the notification the output switch 52 initiates a transfer of the packet from memory 54 to the respective output port 60 associated with the search result.

Certain packets allow routers to add new entries in forwarding tables, while other packets inform the routers that an entry in a routing table should be modified or deleted, and the remaining packets follow the routes indicated by the previously added forwarding table entries. An IP longest prefix match process adds a new route entry into the forwarding table, given an IP address and a prefix that includes 32 bits, where the bits are a series of leading 1's followed by all 0's. The route look-up (i.e., given a 32 bit IP address only (no prefix mask)) returns the route entry that has the longest prefix match. It is important for routers to perform the route look-up in the forwarding table in the shortest possible time, or with the fewest accesses to memory, in order to achieve high packet forwarding throughput. It may also be desirable to update the forwarding table without stopping packet forwarding altogether.

In an embodiment, route look-up engine (RLE) 64 performs a longest prefix match process on two trees of tables generated and written to by a core processor within the router 14.

Figure 3:
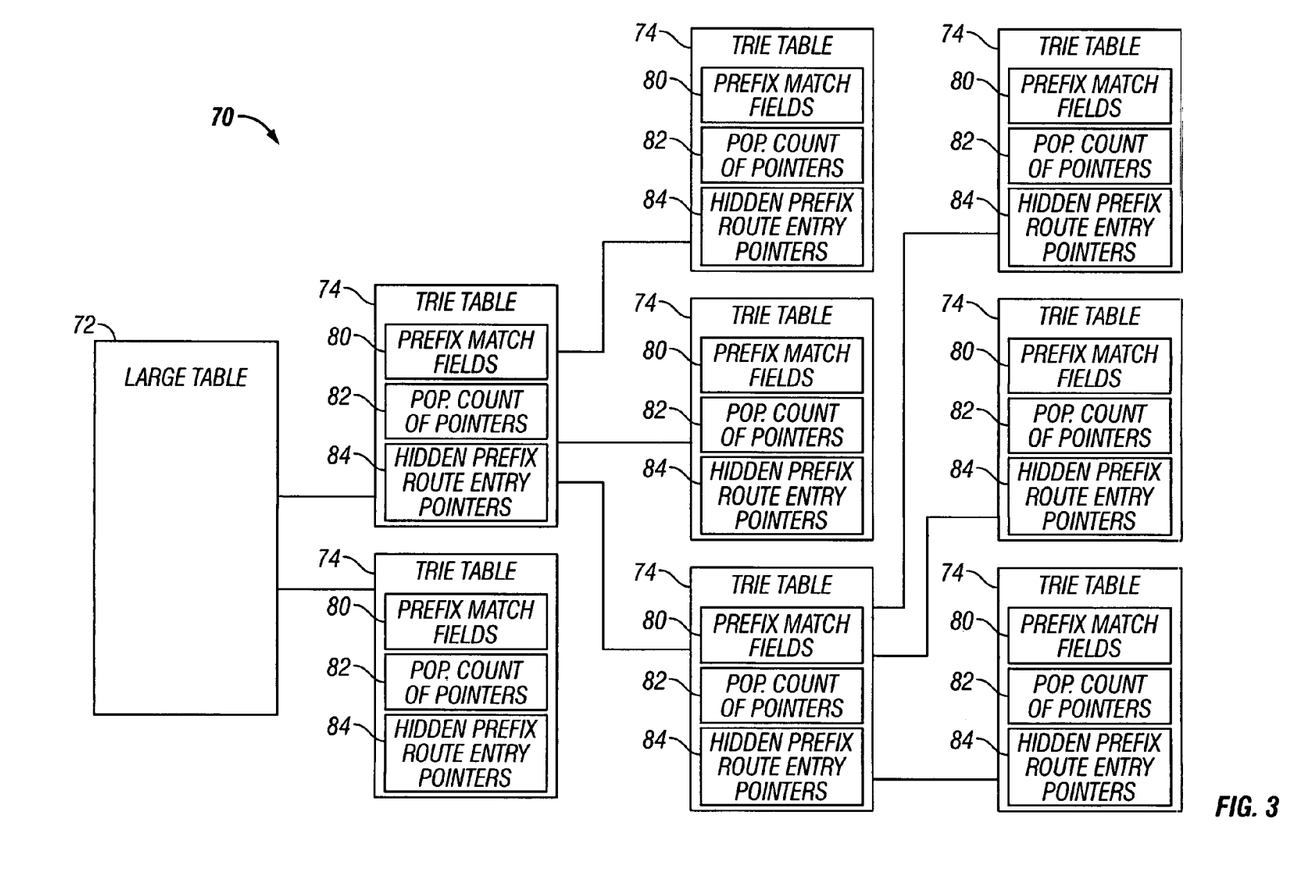
FIG. 3 is a block diagram of a tree data structure used in the router of FIG. 2.

Referring to FIG. 3, a data structure 70 includes a large table 72 at the root, branching to small tables 74, called trie tables. A traversal proceeds in parallel on the two trees, using pipelined reads. Each trie table 74 is addressed by a span of IP destination address bits to locate an indexed table entry. Each indexed trie table entry can optionally contain a route entry pointer and a pointer to the next table. Each trie table 74 contains prefix match fields 80 for each indexed entry, a population count of pointers 82, and hidden prefix entries 84 that hold shorter prefix route entry pointers. A leaf entry is copied to other leaf entries in the same trie table 74 to enable matches on multiple IP destination addresses, yielding the route entry that has the longest prefix match. Hidden entries are copied to shared memory entries when a longer prefix entry is deleted.

Each of the trie tables 74 is used to facilitate a fast route look-up. Information structures, described below, are used to store pointers and masks used only by the route table look-up engine 64 during route add and delete. In an embodiment, the trie tables 74 are kept in SRAM and are used for look-ups as well as for route add/deletes. As described above, each trie table 74 includes a set of trie entries. A trie entry is a 32-bit longword, divided into two fields, i.e., a route pointer and a trie pointer. If the trie entry is zero, there is no route. If the trie pointer is non-zero, there is a longer prefix entry to be found. If the route pointer is non-zero, there is a route entry at the current prefix length of this trie entry's table.

Figure 4:
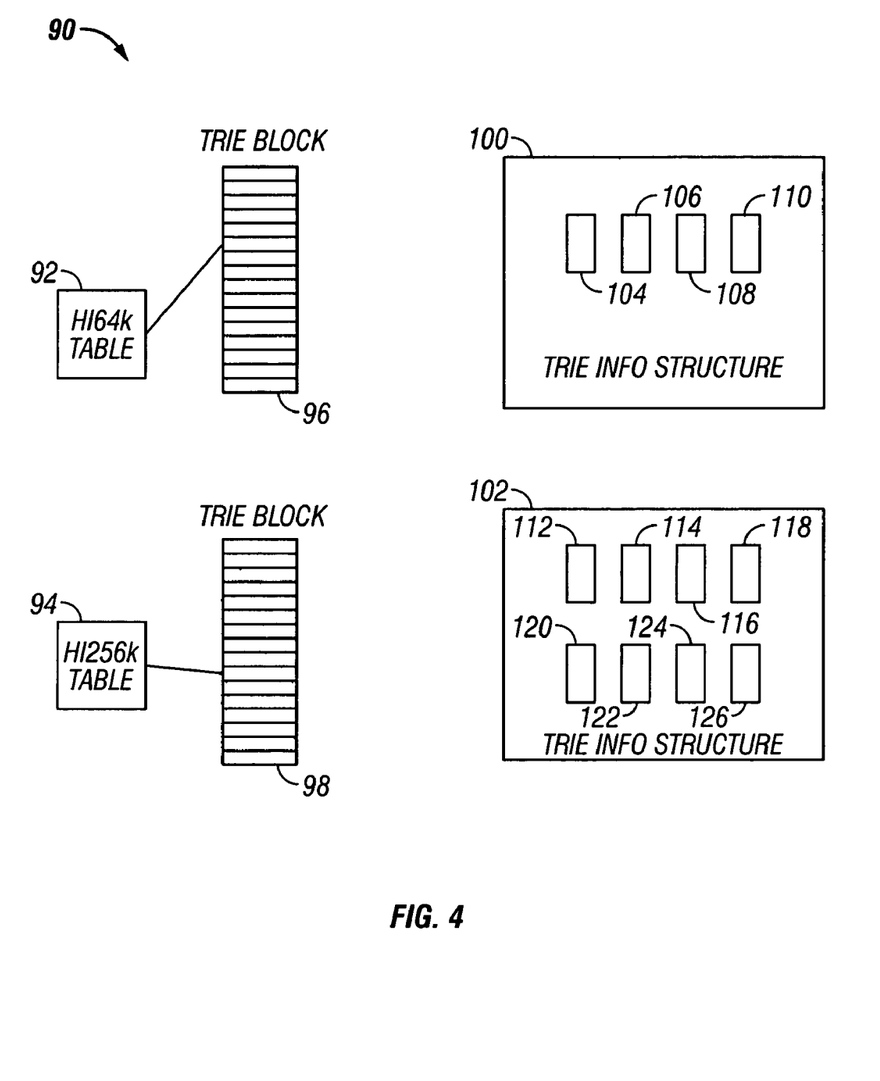
FIG. 4 is a block diagram of a trie data structure.

Referring to FIG. 4, a data structure 90 includes a hi64 k table 92 and a hi256 table 94. The hi64 k table 92 is a single 64 k entry table that is indexed by bits 31:16 of an IP address. The prefix length associated with this table is sixteen. The hi256 k table 94 is a single 256 entry table that is indexed by bits 31:24 of the IP address. The prefix length associated with the hi256 k table 94 is eight.

There are multiple trie blocks, e.g., trie block 96 and 98, that are dynamically allocated as needed. Each trie block 96 and 98 contain sixteen entries. Extending from the hi64 k table 92 or hi256 table 94, trie blocks form a tree with each node representing 4 bits of addresses, and covering an extension of 1–4 bits of prefix from the previous trie node. In an embodiment, trie nodes are kept in SRAM.

Each trie block 96 and 98 has a corresponding trie block information structure. Specifically, trie block 96 has trie block information structure 100 and trie block 98 has trie block information structure 102. Each trie block information structure 100 associated with the hi64 k table 92, for example, includes a prefix 1 [2] member 104, a prefix 2 [4] member 106, a prefix 3 [8] member 108 and a mask [16] member 110.

The prefix 1 [2] member 104 is used to hold route entry pointers for each entry with prefix mask field length of 1. The prefix 2 [4] member 106 is used to hold route entry pointers for each entry with prefix match field length of 2. The prefix 3 [8] member 108 hold route entry pointers for each entry with prefix mask field length of 3. The mask [16] member 110 contains a 4-bit prefix mask field to indicate the prefix length of the associated trie entry.

The trie information structure 102 associated with the hi256 table 94 includes a prefix 1 [2] member 112, a prefix 2 [4] member 114, a prefix 3 [8] member 116, a prefix 4 [16] member 118, a prefix 5 [32] member 120, a prefix 6 [64] member 122, a prefix 7 [128] member 124 and a mask [256] member 126. Each of the members is used as follows:

prefix 1 [2] 112: hold route entry pointers for entries with prefix mask field length of 1;

prefix 2 [4] 114: hold route entry pointers for entries with prefix mask field length of 2;

prefix 3 [8] 116: hold route entry pointers for entries with prefix mask field length of 3;

prefix 4 [16] 118: hold route entry pointers for entries with prefix mask field length of 4;

prefix 5 [32] 120: hold route entry pointers for entries with prefix mask field length of 5;

prefix 6 [64] 122: hold route entry pointers for entries with prefix mask field length of 6;

prefix 7 [128] 124: hold route entry pointers for entries with prefix mask field length of 7; and prefix 8 [256] 126: contains an 8-bit prefix mask field to indicate the prefix length of the associated entry.

Figure 5:
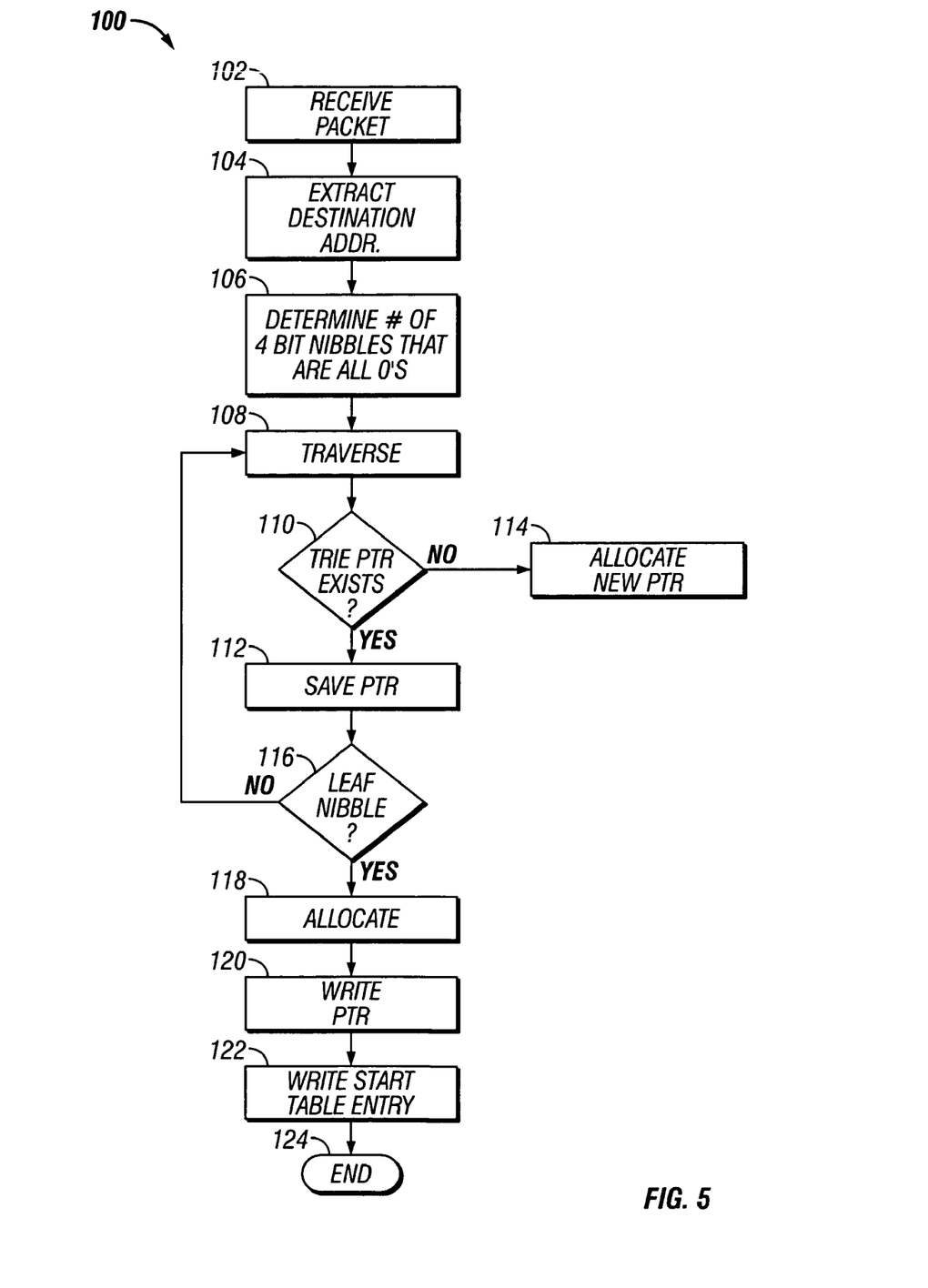
FIG. 5 is a flow diagram of a route add process.

Referring to FIG. 5, a route add process 100 residing in the controller 56 (of FIG. 2) receives 102 an incoming packet and extracts 104 the destination address. The route add process 100 determines 106 the number of trailing 4 bit nibbles that are all 0s. This is a quick loop of maximum eight iterations through the network prefix mask. A start table can be either a 64 khi_table or a 256hi_table.

The process 100 traverses 108 the trie beginning at the start table, either the 64 khi table or 256hi table, going from start trie nibble lowest significant bit (LSB) to end trie nibble LSB. If a trie pointer exists 110 for a next node, the process 100 saves 112 the pointer in a temporary array indexed in the order of the trie traversal. If no trie pointer exists, the process 100 allocates 114 a new pointer and saves 112 the new pointer in the temporary array. When the process 100 reaches the leaf nibble, the process 100 allocates 118 a route entry and, depending on the portion of the network mast for that nibble, writes 120 multiple route entry pointers to the leaf trie block. To decide whether to write an entry, process 100 uses a side mask set to hold the mask nibble for an existing entry. The process 100 writes only if the new entry mask is longer than the existing entry mask. If the new entry nibble mask is 0xf, the process 100 will write one entry. If the new entry nibble mask is 0xe, the process 100 will attempt to write two entries, as described below. When the leaf has been written, the trie is filled in going from leaf toward root. In this manner concurrent route lookups will not be directed to non-existent entries. Finally, the process 100 writes 122 the start table entry, thus completing 124 the update.

If the start table is hi256_table, the process 100 performs a multiple write for up to 128 entries based on network prefix mask bits 31:24. If the submask is 0xff, the process 100 writes one entry; if submask is 0xfe, the process 100 attempts to write two entries, and so forth.

In an embodiment, a pre-allocated variation of the process 100 is employed, where a set of route adds are sorted by length, and the 64 khi_table is updated with multiple writes starting with shortest prefix, going to longest. In this way the process 100 does not need to compare the previous mask. This is generally not preferred in systems where dynamic route updates occur, because a single 64 khi_table update may require up to 32 k read/writes, and seriously impact concurrent forwarding performance.

When writing a leaf trie block, multiple entries may have to be selectively written, depending on the mask and existing entries. This sets up the leaf trie block for the longest prefix match within the last 4 bits of the IP address that have any corresponding network prefix mask bits set. A lookup needs only to read the leaf trie block with a 4 bit address index. During lookup it the correct longest match entry will be found. Writing multiple entries utilizes a side table that holds the 4 bit masks for each of the 16 valid entries. When and if the 4 bit mask is 0xf, the trie block and tri block mask entries for just one location are written. If the 4 bit mask is 0xe, entries for two locations are written, if the new mask is longer than the mask in the trie block mask. If the 4 bit mask is 0xc, entries for four locations are written, if the new mask is longer than the mask in the trie block mask. If the 4 bit mask is 0x8, entries for 8 locations are written, if the new mask is longer than the mask in the trie block mask. The single entry update is a read of previous trie pointer organized with new route pointer.

To support a delete entry function (described below), if a sub mask length for the hi256 table is less than eight, or for a trie block, is less than four, the route pointer is saved in the information structure prefix member field corresponding to the sub mask length. The prefix members can later be retrieved and inserted in place of deleted entries with longer sub mask length.

Figure 6:
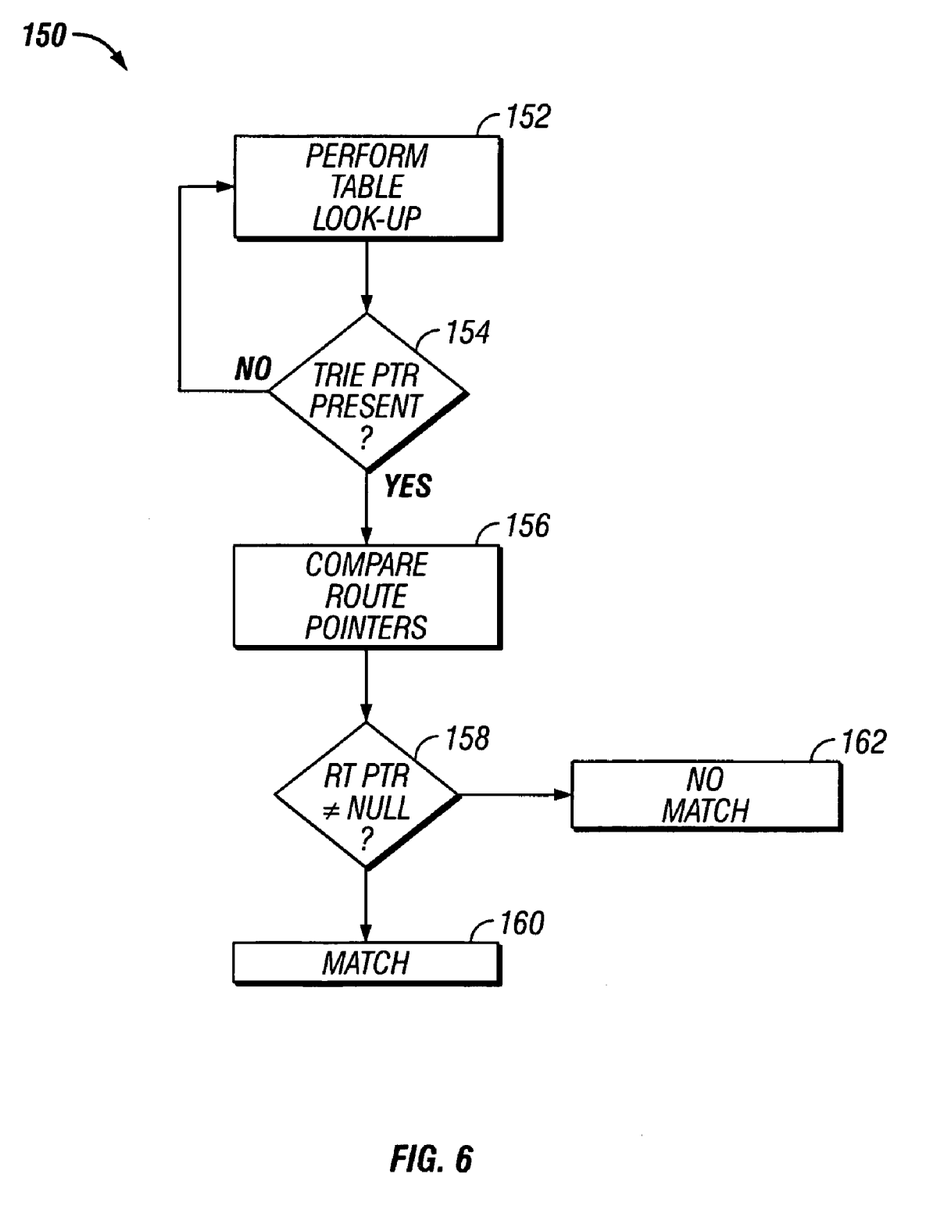
FIG. 6 is a flow diagram of a longest prefix match look-up process.

Referring to FIG. 6, a longest prefix match look-up process 150 includes performing 152 two parallel depth-wise tree searches, one starting at the hi64 k table, and the other starting at the hi256 table. A longest prefix match look-up utilizes the tables set up by the route add process 100. First table lookup, tree nodes represent 4 bits of address. Each lookup includes 2 halfwords, i.e., a possible pointer to the route entry (rt_ptr_long and rt_ptr_short), and a possible pointer to the next node in the tree (trie_ptr_long and trie_ptr_short). The process 150 determines 158 whether there is a trie_ptr. If no trie_ptr exists, the resulting rt_ptrs are compared 156. The process 150 determines whether the rt_ptr_long is non-null. If non-null, the process 150 selects 160 the prefix as a match. If rt_ptr_short is non-null, it is the match. If rt_ptr_short is null, process 150 reports 162 no match.

Each trie block has sixteen leaves that are indexed by 4 bits of IP destination address. The full binary tree of possible matches is 16+8+4+2, or 30 possibilities. If all of these combinations are added (sixteen routes with submask length 4, eight routes with submask length 3, four routes with submask length 2 and two routes with submask length 1), there will be fourteen hidden entries. Following this, if any one of the longer submask entries is deleted, the deleted entry will be replaced by the entry with the next longest submask. The route add process 100 stores the hidden entries in prefix1–3 members of trie_info. The same is done for the hi256 table, where hidden entries are stored in prefix1–7 members of hi256_info.

In addition to deleting the route table entry, deleting a route removes the corresponding trie entry, and traces back through the prefix members (e.g., prefix 3 then prefix 2, then prefix 1) to find the entry next longest prefix. It then inserts the route pointer found there into the trie block entry.

A population count is kept for each trie block, to count the number of trie pointers and route entry pointers. The count is incremented when either of these is added, and decrements when either of these is removed. When the population goes to 0 as a result of a deletion, the trie block is pushed back to a trie block freelist. When a route entry is deleted, its contents are zeroed, and it is pushed back to a route entry freelist.

A number of embodiments of the invention have been described. Nevertheless, it will be understood that various modifications may be made without departing from the spirit and scope of the invention. Accordingly, other embodiments are within the scope of the following claims.

What is claimed is:

1. A network router comprising:
   an input switch;
   an output switch;
   a controller, the controller comprising a plurality of look-up engines, the look-up engines receiving look-up requests in a round robin fashion; and
   a memory for storing data for access by a longest prefix match program, the program comprising:
   a data structure stored in the memory, the data structure including information used by the longest prefix match program and including:
      at least one first table at a root, the at least one first table comprising entries indexed according to a first portion of an Internet Protocol (IP) address span and maintaining links to a first set of nodes containing a first set of trie tables corresponding to less significant portions of the IP address span, the entries of the at least one first table not including links to route entries, each table of the first set of trie tables configured to be indexed according to address bits in the corresponding IP address span of that trie table to locate an indexed trie entry, the indexed trie entry including a corresponding route pointer and a corresponding trie pointer; and
      at least one second table at the root, the at least one second root table comprising entries indexed according to a second portion of the IP address span, each entry of the at least one second root table including a corresponding route pointer and a corresponding trie pointer, at least some of the entries having corresponding trie pointers pointing to entries in a second set of trie tables at a second set of nodes;
   computer instructions that, when executed, cause the look-up engines to traverse in parallel the first table at the root and its linked first set of trie tables, and the second table at the root and its linked second set of trie tables.

2. The router of claim 1 wherein the each trie table of the first set of trie tables and the second set of trie tables comprises:
   prefix match fields for each indexed entry;
   a population count of pointers; and
   hidden prefix entries.

3. The router of claim 2 wherein the each of the hidden prefix entries hold shorter prefix entry pointers.

4. The router of claim 2 wherein the trie tables are stored in a static random access memory (SRAM) and used for route lookups, route adds and route deletes.

5. The router of claim 2 wherein the indexed trie entry is a 32-bit longword.

6. A network router comprising:
   a plurality of input ports linked to an input switch;
   an output switch linked to a plurality of output ports;
   a controller, the controller comprising a plurality of look-up engines, the look-up engines receiving look-up requests in a round robin fashion; and
   a memory, the memory including a process for searching a database for a prefix representing a destination address, the process comprising:
   reading a data structure stored in the memory, the data structure comprising:
      at least one first table at a root, the at least one first table comprising entries indexed according to a first portion of an Internet Protocol (IP) address span and maintaining links to a first set of nodes containing a first set of trie tables corresponding to less significant portions of the IP address span, the entries of the at least one first table not including links to route entries, each table of the first set of trie tables configured to be indexed according to address bits in the corresponding IP address span of that trie table to locate an indexed trie entry, the indexed trie entry including a corresponding route pointer and a corresponding trie pointer;

at least one second table at the root, the at least one second root table comprising entries indexed according to a second portion of the IP address span, each entry of the at least one second table including a corresponding route pointer and a corresponding trie pointer, at least some of the entries having corresponding trie pointers pointing to entries in a second set of trie tables at a second set of nodes;

traversing in parallel the first root table and its linked first set of trie tables and the second root table and its linked second set of trie tables to find a match of a trie entry to the prefix.

7. The router of claim 6 wherein each route pointer represents a corresponding destination address and each trie pointer points to a different trie table.

8. The router of claim 6 wherein each trie table comprises:
prefix match fields for indexed table entries;
a population count of pointers; and
hidden prefix entries that hold shorter prefix route entry pointers.

9. The router of claim 6 further comprising reporting a non-match if the prefix does not match an entry.

10. The router of claim 6 wherein the first root table is a single 64 k entry table that is indexed by bits 31:16 of an internet protocol (IP) address.

11. The router of claim 6 wherein the second root table is a single 256 entry table that is indexed by bits 31:24 of an internet protocol (IP) address.

12. The router of claim 10 wherein each of the trie tables of the first set of trie tables is dynamically allocated and comprises:
a tree with each node representing 4 bits of addresses covering an extension of 1–4 bits of a prefix entry from a previous tree.

13. The router of claim 11 wherein each of the trie tables of the second set of trie tables is dynamically allocated and comprises:
a tree with each node representing 4 bits of addresses covering an extension of 1–4 bits of a prefix entry from a previous tree.

14. The network router of claim 1, further comprising computer instructions that when executed cause the controller to:
add a new entry to a trie table selected from at least one of: the first set of trie tables, and the second set of trie tables; and
delete an old entry from a trie table selected from at least one of: the first set of trie tables, and the second set of trie tables.

15. The network router of claim 14, wherein the computer instructions that cause the controller to delete the old entry from the selected trio table include instructions that, when executed, cause the controller to:
remove the old entry;
decrement a population counter associated with the selected trio table;
identify another entry having the next longest prefix; and
insert the identifies next longest prefix into the trie.

* * * * *